No. 799,395. PATENTED SEPT. 12, 1905.
M. N. LYNN.
WATER FILTER SCRAPER.
APPLICATION FILED OCT. 6, 1904.

Witnesses.
Henry D. Bauer
John B. Helwig

Inventor.
Minshaw Norman Lynn
by John Welch Pack
Attorney.

UNITED STATES PATENT OFFICE.

MIRABEAU N. LYNN, OF CINCINNATI, OHIO, ASSIGNOR TO THE LYNN FILTER MANUFACTURING COMPANY, OF CINCINNATI, OHIO, A CORPORATION OF OHIO.

WATER-FILTER SCRAPER.

No. 799,395. Specification of Letters Patent. Patented Sept. 12, 1905.

Application filed October 6, 1904. Serial No. 227,480.

*To all whom it may concern:*

Be it known that I, MIRABEAU NORMAN LYNN, a citizen of the United States, residing in the city of Cincinnati, Hamilton county, and State of Ohio, have invented a new and useful Water-Filter Scraper, of which the following is a specification.

My invention relates to the scraper used to scrape or cleanse the cylinder of that class of water-filters in which the filtering medium is a cylindrical tube of stone or artificial stone and which have a scraping device operated from the exterior without taking the filter apart.

The object of my invention is to provide a scraping device of greater durability than any heretofore used, truer in its movements around the surface of the filtering-cylinder, and more perfect in operation. I attain these objects by the mechanism illustrated in the accompanying drawings, in which—

Figure 2:
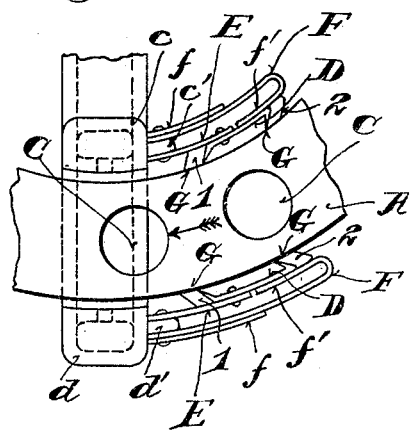
Figure 1:
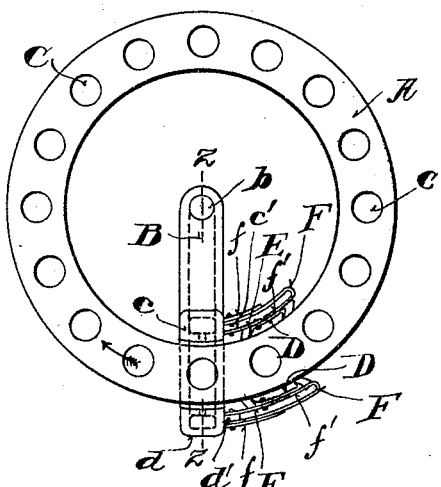
Figure 3:
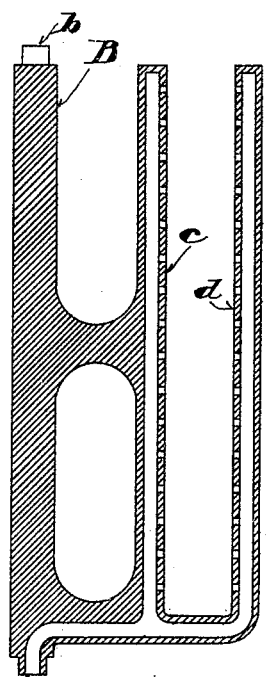
Figure 4:
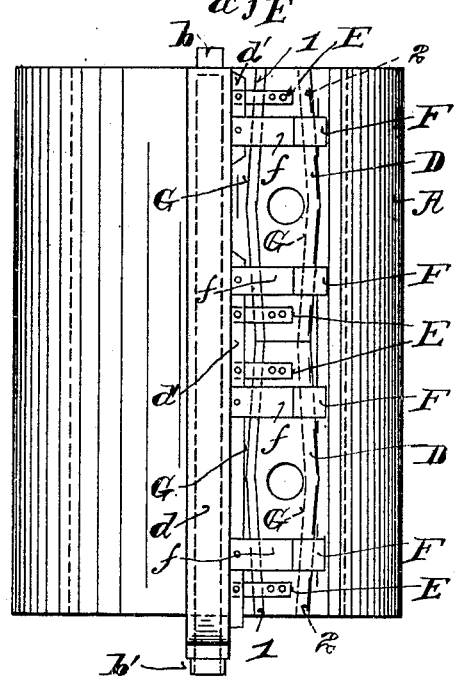

Figure 1 is a plan view of my improved device. Fig. 2 is an enlarged view of that portion of Fig. 1 illustrating the scraper and its attachment to the scraper-frame. Fig. 3 is a central longitudinal section of the tubular scraper-frame, taken on the line $z\ z$ of Fig. 1; and Fig. 4 is a side elevation of the filtration-cylinder, scraper-frame, and scrapers.

Similar letters refer to similar parts throughout the several views.

A is the filtration-cylinder, of stone, artificial stone, or like material.

B is the tubular scraper-frame, of iron or suitable material.

C C are core-holes extending longitudinally through the wall of the cylinder A. These are not necessary to the usefulness of the present invention. The principle of my scraper may be used in a filter whether it has these core-holes or not.

That portion of the tubular frame B indicated by the letters $b$ to $b'$ is a shaft or axis extending through the center of the filtration-cylinder and bearing upon a suitable support in the filtering-casing when applied at each end.

$c$ and $d$ are the arms which support the scrapers D.

In that class of filters having core-holes C C extending longitudinally through the cylinder the water filters from both the interior and exterior of the cylinder to the core-holes, dirt necessarily accumulating upon the interior as well as the exterior of the cylinder, and scrapers are necessary upon both the interior and the exterior. In that class of filters not having core-holes and in which the water simply filters from the exterior of the cylinder to the interior thereof no scraper is necessary upon the interior thereof, and it will consequently be omitted, it not being essential to my device. As shown, there are two scrapers D D extending the length of the cylinder. There may be, however, but a single one, or there may be more than two scrapers. The scrapers are attached to the arms $c$ and $d$, preferably by metal straps E, secured to lugs $c'\ d'$ on said respective arms, which straps are preferably secured by metal screws or otherwise to the scraper D at one end and to the arms $c$ and $d$ at the other end. Springs F, shown as reversely-bent springs, are also attached to the respective arms $c\ d$, as to the lugs $c'\ d'$ thereon, reinforce-blades $f$, also secured to the respective arms $c\ d$, as to the lugs $c'\ d'$ thereon, taking against the outer faces of the springs F for urging said springs F toward the scrapers. The outer ends $f'$ of the springs F are reversely bent with relation to the body proper of said springs and are bent inwardly, taking against the scrapers for urging the scrapers toward the filtration-cylinder.

The tubular scraper-frame B is revolved by a crank or wheel or other device properly attached to the shaft $b\ b'$ from left to right, as indicated by the arrows on Figs. 1 and 2, the straps E serving to drag the scrapers around the surface of the cylinder and the springs F to hold the same against the cylinder.

The scrapers D are plow-shaped and have scraping-flanges 1 2 located, respectively, at the forward and rear edges of said scrapers. These flanges extend at an oblique angle to the length of the filtration-cylinder, their respective ends extending at an oblique angle with relation to each other. It will be seen by reference to Fig. 4 that they approach each other at the longitudinal ends of the respective scrapers and diverge from each other at the middle of said scrapers. These flanges also project at an angle to the radius of said cylinder. The free ends of the reversely-bent parts $f'$ of the springs F bear upon said scrapers between said flanges thereof, causing the pressure upon the scraping edges G thereof to be equalized.

It has been found in practice that a scraper having a scraping edge extending parallel with the length of the filtration-cylinder is liable to chattering or jar in passing over the surface of the cylinder for cleansing the same, this chattering or jarring being almost imperceptible when the parts are new, but each vibration of the chattering or jarring causing an almost infinitesimal abrasion or roughening of the surface of the cylinder, this abrasion or roughening causing increasingly-emphasized chattering or jarring of the parallel scrapers upon each passage thereby of such abrasion or roughened line, resulting in consequent increasing wear of and injury to the cylinder, the surface of the latter gradually acquiring pronounced ridges, preventing proper cleaning of the cylinder and consequent loss of capacity of the filter. I avoid all these objections by my new and improved construction in which the scraping edge of the scraper makes contact with and passes over the surface of the cylinder with what may be termed a "shear cut" for removing the deposit thereon, the relative angles of the forward and rear scraping edges of each scraper being preferably bisecting, and the line of contact of the scraping edge of the scraper being at an angle to the direction of length of the cylinder and to the direction of movement, the connection between the scraper and its moving strap being preferably at the fore part of the scraper. The method of operation of my scraper is to revolve the scraper-frame B by means of a crank or wheel or other suitable device conveniently attached to the shaft $b\ b'$, the metal straps E thus serving to drag the scrapers D, and thus cleaning the surface of the filtration-cylinder.

I do not claim a rotary scraping device for stone tubular filters broadly; but

What I do claim as my invention, and desire to secure by Letters Patent, is—

1. In a water-filter, the combination of a filtration-cylinder and a dragging scraper therefor, said scraper having a forward scraping edge and a rear scraping edge, said scraping edges being angled with relation to each other and to the longitudinal surface of said cylinder, substantially as described.

2. In a water-filter, the combination of a filtration-cylinder and a dragging scraper therefor, said scraper having a forward scraping-flange and a rear scraping-flange, said flanges extending tangentially of said cylinder, and said scraping-flanges having scraping edges making contact with the periphery of said cylinder along lines extending at angles with relation to each other and to the longitudinal axis of said cylinder, substantially as described.

3. In a water-filter, the combination of a filtration-cylinder and a dragging scraper therefor, said scraper having a plurality of scraping edges respectively making contact with the periphery of said cylinder along lines extending at angles with relation to each other and to the longitudinal axis of said cylinder, substantially as described.

4. In a water-filter, the combination with a filtration-cylinder and scraper-frame arranged to be rotated with relation thereto, a scraper having dragging connection with said scraper-frame, said scraper having a plurality of scraping edges making contact with said cylinder along lines extending at angles with relation to each other and to the longitudinal axis of said cylinder, and a reversely-bent spring having connection with said scraper-frame and scraper for urging said scraper toward said cylinder, substantially as described.

5. In a rotary scraping device for stone or artificial-stone filtration-cylinders, the combination of a rotary scraper-frame revolving upon a center shaft and having an arm parallel to the longitudinal axis of said cylinder, a metal scraper having a plow-shaped scraping edge presented to the surface of the cylinder, the contact of said scraping edge along the surface of said cylinder progressing across different radii of said cylinder, metal strap connection between said scraper and arm, the direction of rotation of the scraper-frame being such that the scraper follows said arm of said scraper-frame, and a spring compelling contact between said scraper and cylinder, substantially as described.

M. N. LYNN.

Attest:
JOHN W. PECK,
WM. H. SCHMIDT.